United States Patent

Handy

[15] 3,703,035

[45] Nov. 21, 1972

[54] CABLE STRIPPER
[72] Inventor: Everett L. Handy, 77 Arizona Avenue, Holden, Mass. 01520
[22] Filed: June 14, 1971
[21] Appl. No.: 153,007

Related U.S. Application Data

[63] Continuation of Ser. No. 792,927, Jan. 22, 1969, abandoned.

[52] U.S. Cl. ................................30/90.9, 30/90.4
[51] Int. Cl. .............................................B26b 27/00
[58] Field of Search..............................30/90.1–92.5

[56] References Cited

UNITED STATES PATENTS 2,649,654   8/1953   Carta........................30/90.9
2,830,366   4/1958   Chisena..................30/92.5 X
1,866,095   7/1932   Foley.....................30/90.8 X Primary Examiner—Andrew R. Juhasz
Assistant Examiner—Gary L. Smith
Attorney—Norman S. Blodgett

[57]  ABSTRACT

In general, this invention relates to a device for stripping the outer covering of multi-strand electrical cable; more specifically, it has to do with a device that splits the covering along a given length of cable.

5 Claims, 5 Drawing Figures

PATENTED NOV 21 1972  3,703,035

INVENTOR.
EVERETT L. HANDY
BY
*Nancy S. Blodgett*
ATTORNEY

CABLE STRIPPER

This application is a continuation of application Ser. No. 792,927, filed Jan. 22, 1969, now abandoned.

BACKGROUND OF THE INVENTION

To those skilled in the art, it has long been recognized that the use of a razor blade or jackknife is a dangerous and inefficient way of stripping the outer covering of multi-strand cable. The craftsman, particularly the electrician, is constantly concerned with this safety factor and, for this reason, numerous devices have been designed to lessen this danger. All of these devices, however, seemed to have drawbacks; they either failed to offer safe operation, they were complicated or inefficient in use, their construction made them commercially impractical with respect to cost or effective life, or they were not suited for variations of types of cable. These and other difficulties experienced in the prior art devices have been obviated in a novel manner by the present invention.

It is, therefore, an outstanding object of the invention to provide a cable stripper which is completely safe under normal conditions.

Another object of this invention is the provision of a cable stripper which is simple in construction, inexpensive to manufacture, and capable of a long life of useful service with a minimum of maintenance.

A further object of the present invention is the provision of a cable stripper which can be placed on and removed from the cable laterally without the necessity of threading it through the stripper; this is particularly important when several feet of cable must be stripped, as is often the case in wiring machine tools.

It is another object of the instant invention to provide a cable stripper which is equally effective on both round cable and flat cable, such as "Romex."

A still further object of the invention is the provision of a cable stripper which works in such a way that the extent of the split through the layers of covering can be sensed, thus permitting the stripping of only the desired layer; means is also provided for pre-setting the depth of cut.

It is a further object of the invention to provide a cable stripper whose cutting tool is an easily replaceable razor blade.

It is a still further object of the present invention to provide a cable stripper whose operation is simple, efficient, and easily learned by a new operator.

Another object of the invention is the provision of a cable stripper whose size and compactness facilitate its availability and storage.

A further object of the invention is to provide a cable stripper whose simplicity and strength make it nearly indestructible during normal use.

With these and other objects in view, as will be apparent to those skilled in the art, the invention resides in the combination of parts set forth in the specification and covered by the claims appended hereto.

SUMMARY OF THE INVENTION

In general, the present invention consists of a cable stripper having a housing from which protrude two rollers, one adapted for round cable and one for flat cable, having a blade, and having a blade holding arm attached to the housing in such a way that the blade can be placed in opposition to either roller and the distance between the cutting edge and the roller varied.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
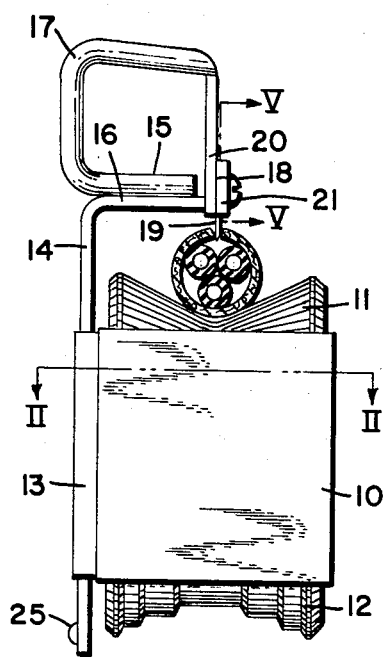
FIG. 1 is a front elevational view looking along the length of wire to be stripped.
Figure 2:
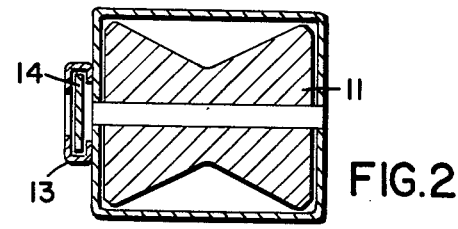
FIG. 2 is a sectional view taken on the line II—II of FIG. 1.
Figure 5:
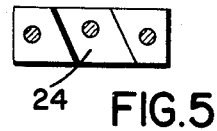
FIG. 5 is a sectional view of a portion of the invention taken on the line V—V of FIG. 1.
Figure 3:
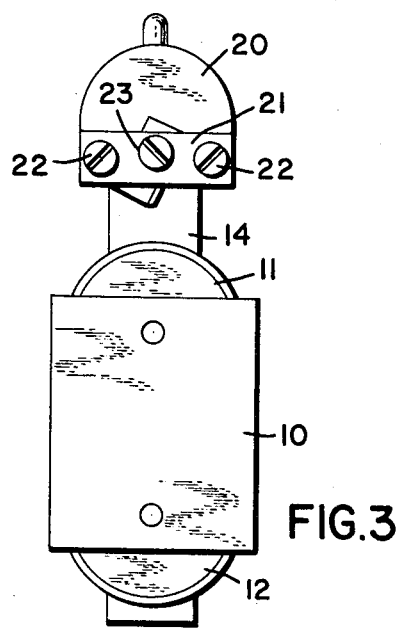
FIG. 3 is a right elevational view of the invention.
Figure 4:
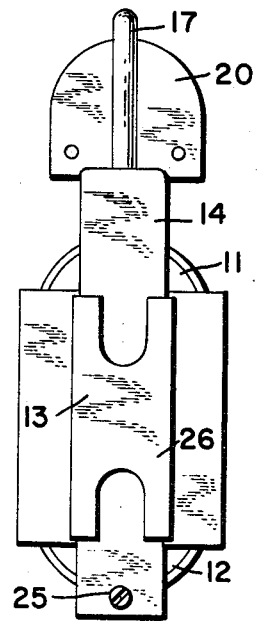
FIG. 4 is a left elevational view of the invention.

Referring first to FIG. 1, wherein are best shown the general features of the invention, the cable stripper is shown as having a rectangular tubular or box-like housing 10 having open ends. Rotatably mounted and having their peripheries extending from the said open ends of the housing are two rollers 11 and 12. At one end is mounted a spool-like roller 11 with opposing conical surfaces adapted to be used with round cable. From the other end extends a spool-like roller 12 with opposing stepped surfaces, the steps being positioned to accommodate a flat cable, such as Romex 12-2 cable on a first level, No. 6 service cable on a second level, and 1-3 or 3-3 cable on a third level. A guiding channel 13 is mounted on the side of the housing 10 and carries a slide or cutting head support arm 14. This arrangement allows the slide to move up and down in the plane of and perpendicular to the roller axes. Mounted on the cutting head support arm 14 is a cutting head 15 which consists of a transverse arm 16 which may be integral with the support arm, a thumb ring 17, a blade holder 18, and a blade 19. The blade holder itself (best shown in FIG. 3) consists of a back plate 20, a positioning plate 21 attached to the back plate by screws 22, and a blade-tightening screw 23 which goes through the positioning plate and engages the blade. The blade itself rests between the positioning plate and the back plate. The blade holder holds the blade so that it rests and moves in a plane which is perpendicular to and bisects the axes of the rollers. The travel of the support arm is regulated by a limiting screw 25 when it contacts the web 26.

The use and operation of the invention will now be readily understood, in view of the above description. Let us say that we are given the device as set up in FIG. 1 and asked to strip a length of Romex 12-2 cable. The limiting screw 25 is removed and the cutting head 15 and support arm are pulled out of the guiding channel 13 and replaced in the opposite end of the channel, thereby bringing the head into opposition with the stepped roller. The limiting screw is then replaced. The cable is placed tangentially across the center of the stepped roller so that it rests with its long axis parallel to the roller axis and is held securely by the narrowest groove that will accommodate it. The housing is grasped in the right hand of the user with the guiding channel in the palm and the cutting head uppermost, so that the thumb can be placed in the thumb ring 17. The pressure of the thumb then forces the blade into the covering of the cable and, as the device is pulled along the cable, the covering is split. It is found preferable to begin the operation at the interior end of the length to be stripped. The procedure for stripping round cable will be evident from the above description.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A cable stripper, comprising:
   a. a housing,
   b. a spool-like first roller with facing conical surfaces rotatably mounted in the housing with a portion of its periphery extending from the housing,
   c. a spool-like second roller rotatably mounted in the housing with a portion of its periphery extending from the housing and
   d. a blade mounted on the housing and changeable from a first position in opposition to the first roller to a second position in opposition to the second roller, said blade being mounted in a cutting head, said cutting head consisting of a blade holder which sets blade angle and is adjustable for cutting depth, a thumb ring, a transverse arm which locates the blade over the center line of the roller surface, and a cutting head support arm that is slidably mounted on the housing.

2. A cable stripper as recited in claim 1, wherein the housing is a rigid, box-like structure with two open ends.

3. A cable stripper as recited in claim 2, wherein the two rollers are rotatably mounted with parallel axes and extend peripherally one from each of the open ends of the housing.

4. A cable stripper as recited in claim 3, wherein an injector razor blade is used as the blade.

5. A cable stripper as recited in claim 4, wherein the blade is mounted at an angle so that it presents its cutting edge to the oncoming covering of the cable.

* * * * *